(12) United States Patent
Depondt (10) Patent No.: US 11,975,694 B2
(45) Date of Patent: May 7, 2024

(54) WIPER DEVICE AND METHOD FOR ASSEMBLING THE WIPER DEVICE

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/961,644

(22) Filed: Oct. 7, 2022

(65) Prior Publication Data

US 2023/0115983 A1  Apr. 13, 2023

(30) Foreign Application Priority Data

Oct. 7, 2021 (DE) ..................... 10 2021 211 306.0

(51) Int. Cl.
| | | |
|---|---|---|
| *B60S 1/38* | (2006.01) | |
| *B60S 1/04* | (2006.01) | |
| *B60S 1/34* | (2006.01) | |
| *B60S 1/52* | (2006.01) | |

(52) U.S. Cl.
CPC ........... *B60S 1/3862* (2013.01); *B60S 1/3415* (2013.01); *B60S 1/0408* (2013.01); *B60S 1/381* (2013.01); *B60S 1/524* (2013.01)

(58) Field of Classification Search
CPC ........ B60S 1/522; B60S 1/524; B60S 1/3415; B60S 1/3862; B60S 1/381
USPC .......................... 15/250.201, 250.32, 250.04
See application file for complete search history.

(56) References Cited

U.S. PATENT DOCUMENTS

| 6,393,652 | B1* | 5/2002 | Vogt ........................ | B60S 1/522 |
| | | | | 15/250.04 |
| 2007/0143947 | A1* | 6/2007 | Harita ...................... | B60S 1/524 |
| | | | | 15/250.04 |
| 2011/0107541 | A1* | 5/2011 | Caillot ................... | B60S 1/3862 |
| | | | | 15/250.04 |
| 2015/0175131 | A1* | 6/2015 | Caillot ................... | B60S 1/3862 |
| | | | | 15/250.04 |

FOREIGN PATENT DOCUMENTS

| DE | 102008021457 | * | 11/2009 |
| DE | 102014009721 | * | 8/2015 |

(Continued)

OTHER PUBLICATIONS

Machine translation of description portion of German publication 102014009721, published Aug. 2015 (Year: 2015).*

(Continued)

*Primary Examiner* — Gary K. Graham
(74) *Attorney, Agent, or Firm* — Michael Best & Friedrich LLP (57) ABSTRACT

A wiper device (10*a*-10*c*) is proposed comprising at least one wind deflector unit (12*a*-12*c*) and comprising at least one channel unit (18*a*-18*c*) integrated into the at least one wind deflector unit (12*a*-12*c*), and comprising at least one wiper blade adapter (20*a*-20*c*) which includes at least one adapter attachment (24*a*-24*c*) and at least one adapter base body (22*a*-22*c*) and is configured to be coupled to at least one wiper arm (110*a*-110*c*). It is proposed that the wiper device (10*a*-10*c*) comprise a fluid supply unit (38*a*-38*c*) which is configured to supply wiper fluid to the channel unit (18*a*-18*c*) and comprises at least one coupling end piece (40*a*-40*c*) for latching connection to the at least one adapter attachment (24*a*-24*c*).

16 Claims, 5 Drawing Sheets

(56) References Cited

FOREIGN PATENT DOCUMENTS

| DE | 102014114691 | * | 4/2016 |
| EP | 3124336 | * | 2/2017 |
| WO | 2012000972 | * | 1/2012 |

OTHER PUBLICATIONS

Machine translation of description portion of German publication 102008021457, published Nov. 2009. (Year: 2009).*

* cited by examiner

WIPER DEVICE AND METHOD FOR ASSEMBLING THE WIPER DEVICE

BACKGROUND

A wiper device comprising at least one wind deflector unit and comprising at least one channel unit integrated into the at least one wind deflector unit, and comprising at least one wiper blade adapter which includes at least one adapter attachment and at least one adapter base body and is configured to be coupled to at least one wiper arm has already been proposed.

SUMMARY

The invention proceeds from a wiper device comprising at least one wind deflector unit and comprising at least one channel unit integrated into the at least one wind deflector unit, and comprising at least one wiper blade adapter which includes at least one adapter attachment and at least one adapter base body and is configured to be coupled to at least one wiper arm.

It is proposed that the wiper device comprise a fluid supply unit which is configured to supply wiper fluid to the channel unit and comprises at least one coupling end piece for latching connection to the at least one adapter attachment.

A "wiper device" is preferably intended to be understood to mean at least a part, preferably a subassembly, of a windshield wiper. The wiper device can preferably also include the entire windshield wiper, in particular comprising a wiper blade. The wiper device is preferably provided for use on a vehicle. The wiper device, in particular as part of the windshield wiper, is preferably provided for cleaning a surface, preferably a surface of a window on a vehicle. The wiper device is preferably coupled to a vehicle, for example via a wiper arm, for cleaning a vehicle window. An object being provided for a specific function is preferably to be understood to mean that the object fulfils and/or carries out this specific function in at least one application and/or operating state. An "operating state" is preferably intended to be understood to mean a state in which the wiper device is ready for a wiping process and/or a wiping operation and/or is coupled at least to a wiper arm and/or a wiper blade and/or is in a wiping operation in which a wiper strip unit of the wiper device, in particular the windshield wiper, is preferably guided over a vehicle window and thereby advantageously bears against the vehicle window.

The wind deflector unit preferably comprises at least two spoiler elements. The at least two spoiler elements preferably have the same shape. Each spoiler element preferably delimits at least one fluid channel of the channel unit which extends through the spoiler element at least substantially parallel to a longitudinal axis of the spoiler element. The channel unit can alternatively be disposed on the outside of the wind deflector unit, in particular connected to the wind deflector unit, for example by means of clamp elements or the like. A "longitudinal axis" of an object is in particular intended to be understood to mean an axis which extends parallel to a longest edge of a smallest geometric cuboid which just completely encloses the object and preferably extends through a geometric center of the object, in particular the cuboid. "Substantially parallel" is in particular intended here to be understood to mean an orientation of a direction relative to a reference direction, in particular in a plane, whereby the direction has a deviation relative to the reference direction which is in particular less than 8°, advantageously less than 5° and particularly advantageously less than 2°. The at least two spoiler elements are preferably configured to form a connection, in particular a plug connection, with the wiper blade adapter. The at least one wiper blade adapter, in particular the adapter attachment, preferably comprises two fluid connection extensions for fluidic connection to a respective spoiler element. The wiper blade adapter is preferably connected to the fluid channels in the spoiler elements by the fluid connection extensions. Each fluid channel in the spoiler elements preferably comprises at least one fluid-dispensing element for dispensing wiper fluid onto the surface. The two fluid connection extensions are preferably configured in the same way, in particular to have the same length, in particular measured using a length along a respective longitudinal axis. The at least two fluid connection extensions are preferably disposed in alignment with one another. The at least two fluid connection extensions are preferably disposed at opposite ends along the longitudinal axis of the wiper blade adapter. The at least two fluid connection extensions preferably define respective opposite plug connection directions which are oriented at least substantially parallel to the longitudinal axis of the wiper blade adapter. The at least one adapter attachment preferably comprises at least one coupling extension which is configured for connection to the coupling end piece, in particular for insertion into the coupling end piece. The at least one coupling extension is preferably at least twice, preferably at least three times, as long as the fluid connection extensions, in particular measured using a length along a respective longitudinal axis. An insertion direction defined by the coupling extension is preferably oriented at least substantially parallel to the longitudinal axis of the wiper blade adapter, in particular the adapter attachment and/or the adapter base body. An insertion direction defined by the coupling extension is preferably oriented at least substantially parallel to the longitudinal axis of the fluid connection extensions. The at least one coupling extension is preferably disposed offset to the fluid connection extensions in a direction perpendicular to the longitudinal axis of the wiper blade adapter. The at least one adapter attachment can be configured in one piece with the adapter base body.

The fluid supply unit preferably comprises at least one hose element for conveying wiper fluid. The wiper device can comprise a wiper arm, which in particular comprises at least one wiper rod and at least one wiper arm adapter. The wiper rod is preferably configured as a rigid metal rod, which can in particular be curved. The wiper rod preferably comprises an at least substantially round drive through-opening which is configured for coupling to a wiper drive. The wiper arm, in particular the wiper arm adapter, preferably comprises a transverse axis which is oriented at least substantially perpendicular to an axis of rotation of the wiper arm defined by the drive through-opening. The expression "substantially perpendicular" here is in particular intended to mean an orientation of a direction relative to a reference direction, wherein, in particular viewed in a projection plane, the direction and the reference direction enclose an angle of 90° and the angle has a maximum deviation of in particular less than 8°, advantageously less than 5° and particularly advantageously less than 2°. The wiper arm adapter is preferably configured as a part, in particular an end piece, preferably a key bit-like end piece, of the wiper rod. The wiper arm adapter is in particular configured in one piece with the wiper rod. "In one piece" is in particular intended to be understood to mean formed in one piece, whereby the one piece is preferably produced from a single blank, a mass and/or a casting, particularly preferably in an injection molding process, in particular a single and/or multi-component injection molding process. The at least one hose element, in particular the fluid supply unit, preferably extends along a longitudinal axis of the wiper arm over at least 80% of an extent of the wiper arm, preferably over the full extent of the wiper rod at least to the wiper arm adapter. The coupling end piece preferably comprises a hose extension for connection to the hose element. The coupling end piece preferably comprises a coupling opening for receiving the at least one coupling extension for fluidic connection to the wiper blade adapter. The latching connection between the coupling end piece and the wiper blade adapter can preferably be implemented inside the coupling end piece. The coupling extension preferably comprises at least one latching element, such as a latching hook, a latching lug, a snap ball, a clip and/or a snap cylinder, which preferably forms a tip of the coupling extension. The coupling end piece can alternatively comprise at least one latching element, such as a latching hook, a latching lug, a snap ball, a clip and/or a snap cylinder for forming the latching connection between the coupling end piece and the wiper blade adapter. The coupling end piece can alternatively comprise at least one latching recess, in particular on a latching eye-let, for forming the latching connection between the coupling end piece and the wiper blade adapter. The coupling end piece preferably comprises at least one latching recess, which is preferably disposed on an end of the coupling opening which faces the hose extension. The at least one latching recess can alternatively be disposed in a central region of the coupling opening, in particular with respect to an extent of the coupling opening along a longitudinal axis of the coupling end piece. The hose element is preferably connected to the wiper arm, in particular the wiper rod and/or the wiper arm adapter. The coupling end piece is preferably connected to the wiper arm exclusively via the hose element, in particular exclusively indirectly.

The configuration according to the invention of the wiper device makes it possible to achieve an advantageously ensured fluidic connection to the wiper blade adapter. An advantageously uncomplicated mechanical and fluidic connection of the wiper blade can be accomplished. It is in particular possible to achieve an advantageous quick connection of the wiper arm and the wiper blade.

It is further proposed that the adapter attachment comprise at least one sealing ring for a fluidically tight connection to the coupling end piece. The at least one sealing ring is preferably disposed around the outside of the at least one coupling extension, in particular in a sealing ring recess. An advantageously cost-efficient fluidic tightness can be achieved between the wiper blade adapter and the coupling end piece.

It is also proposed that the coupling end piece be configured as a female connector for at least partially receiving the at least one adapter attachment. The coupling end piece is preferably configured to receive at least a major portion of the coupling extension. The coupling end piece is preferably configured to receive at least 60%, preferably at least 75%, particularly preferably at least 80% of an extent of the coupling extension, in particular measured along the longitudinal axis of the coupling extension. An advantageously replicable bringing together of the coupling end piece and the adapter attachment, in particular the coupling extension, can be achieved.

It is further proposed that the coupling end piece comprise at least one hose coupling element and at least one adapter coupling element which are connected to one another. The hose coupling element and the adapter coupling element can be configured as one part. The hose coupling element and the adapter coupling element can be configured in one piece. The hose coupling element is preferably configured for direct connection to the hose element. The adapter coupling element is preferably configured for direct connection to the wiper blade adapter, in particular the adapter attachment. The adapter coupling element preferably delimits at least most of the coupling opening. This makes it possible to achieve an advantageously cost-efficient coupling end piece.

It is also proposed that the hose coupling element and the adapter coupling element be connected to one another by a latching connection. The hose coupling element and the adapter coupling element can be configured as two separate parts to form a, preferably non-releasable, latching connection with one another. The hose coupling element and the adapter coupling element are preferably connected to one another in a fluidically tight manner by a sealing ring. Advantageous accessibility to an interior space of the coupling end piece can be achieved prior to assembly of the coupling end piece.

It is further proposed that the coupling end piece be configured as a female connector comprising a coupling opening which at least substantially has the form of a lock cylinder. An outer contour of the coupling opening disposed facing away from the hose element is preferably configured such that it at least substantially has the form of a lock cylinder. The coupling extension preferably comprises at least one key bit element. An advantageously unambiguous connection position between the adapter attachment and the coupling end piece can be achieved. This in particular makes it possible to advantageously avoid misalignments, for example due to twisting.

It is also proposed that the coupling end piece comprise at least one valve element which is configured as a check valve. The at least one valve element is preferably integrated into the coupling end piece, in particular disposed in the coupling end piece. The at least one valve element can be disposed in the at least one hose coupling element and/or in the at least one adapter coupling element. The at least one valve element can alternatively be disposed in the at least one adapter attachment. This makes it possible to achieve an advantageously rapid dispensing of fluid. An unfavorable backflow of wiper fluid can in particular be reduced.

It is further proposed that the valve element be configured as a duckbill valve. The at least one valve element is preferably made of at least one elastomeric material. This makes it possible to achieve an advantageously cost-efficient and light-weight valve element.

A windshield wiper is furthermore proposed, which comprises a wiper device according to the invention. The windshield wiper preferably encompasses the entire wiper blade and the entire wiper arm. The windshield wiper can in particular include a wiper drive. The wiper blade preferably comprises at least two spring rails. The wiper blade preferably includes at least one wiper strip unit comprising a wiper lip. The wiper blade preferably comprises two end caps. An advantageous compatibility of the individual components of the windshield wiper with one another can be achieved.

A method for assembling a wiper device according to the invention is proposed as well. It is possible to achieve an advantageously quick mechanical and fluidic connection of the wiper arm and the wiper blade.

The wiper device according to the invention, the windshield wiper according to the invention and/or the method according to the invention is/are not intended to be limited to the above-described application and embodiment. The wiper device according to the invention, the windshield wiper according to the invention and/or the method according to the invention can in particular comprise a number of individual elements, components and units and method steps that deviates from a herein mentioned number in order to fulfill a herein described function. Moreover, for the ranges of values indicated in this disclosure, values lying within the mentioned limits are also intended to be considered disclosed and usable as desired.

BRIEF DESCRIPTION OF THE DRAWINGS

Further advantages will become apparent from the following description of the drawing. The drawing shows three design examples of the invention. The drawing, the description and the claims contain numerous features in combination. The person skilled in the art will expediently also consider the features individually and combine them into meaningful further combinations.

The Figures Show.

DETAILED DESCRIPTION

Figure 1:
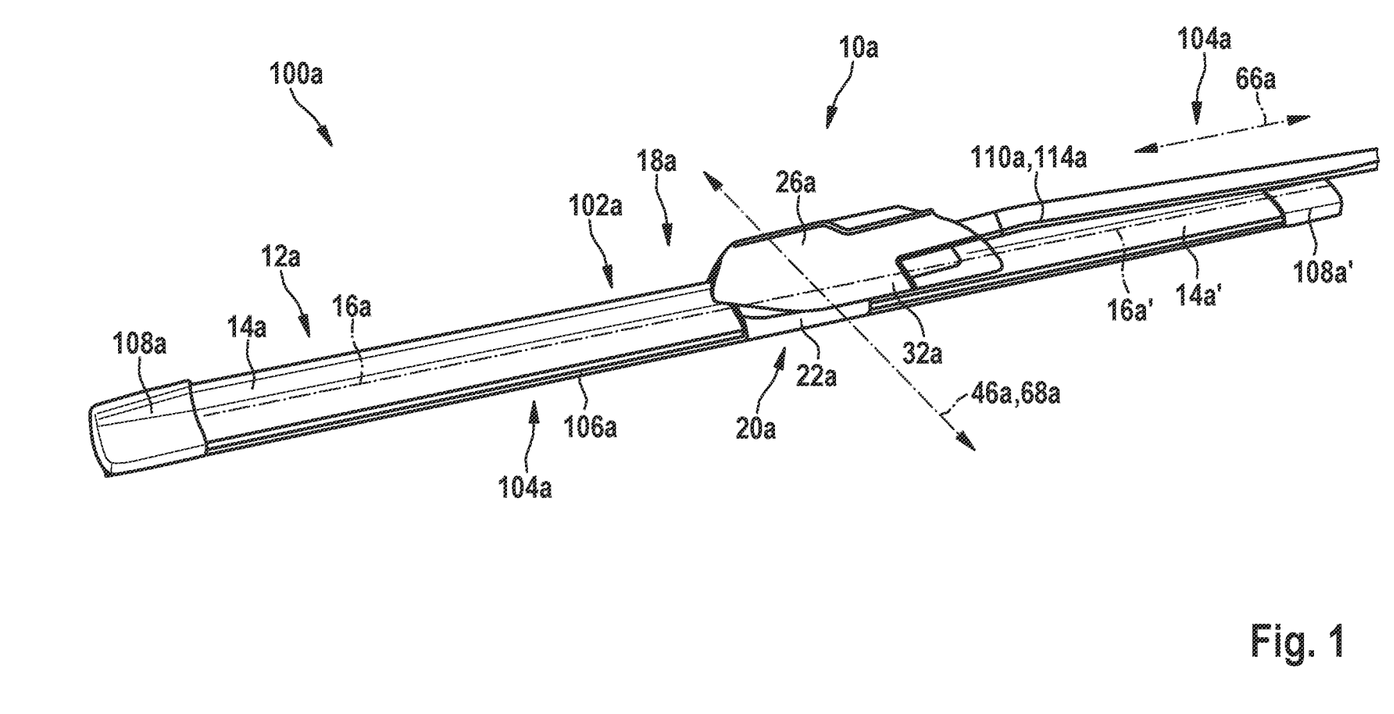
FIG. 1 a windshield wiper according to the invention comprising a wiper device according to the invention in a schematic illustration, FIG. 2 the wiper device according to the invention in a schematic illustration, FIG. 3 the wiper device according to the invention in a schematic illustration, FIG. 4 a method according to the invention in a schematic illustration, FIG. 5 an alternative wiper device according to the invention in a schematic illustration, FIG. 6 a further alternative wiper device according to the invention in a schematic illustration and FIG. 7 the further alternative wiper device according to the invention in a schematic illustration.

FIG. 1 shows a windshield wiper 100a. The windshield wiper 100a encompasses an entire wiper blade 102a and an entire wiper arm 110a. The windshield wiper 100a can include a wiper drive. The wiper blade 102a includes two spring rails. The wiper blade 102a includes a wiper strip unit 104a comprising a wiper lip 106a. The wiper blade 102a includes two end caps 108a, 108'a.

The windshield wiper 100a includes a wiper device 10a. The wiper device 10a comprises a wiper blade adapter 20a. The wiper device 10a comprises a wind deflector unit 12a.

The wind deflector unit 12a includes two spoiler elements 14a, 14'a. The two spoiler elements 14a, 14'a have the same shape. The wiper device 10a includes a channel unit 18a which is partially integrated into the wind deflector unit 12a. Each spoiler element 14a, 14'a delimits a fluid channel of the channel unit 18a which extends through the spoiler element 14a, 14'a parallel to a longitudinal axis 16a, 16'a of the spoiler element 14a, 14'a. The two spoiler elements 14a, 14'a are configured to form a connection, in particular a plug connection, with the wiper blade adapter 20a. Each fluid channel in the spoiler elements 14a, 14'a comprises a plurality of fluid-dispensing elements for dispensing wiper fluid onto a surface to be cleaned.

The wiper blade adapter 20a includes an adapter base body 22a. The wiper blade adapter 20a includes an adapter attachment 24a. The wiper blade adapter 20a includes a retaining spring 26a. The retaining spring 26a is pivotably connected to the adapter base body 22a, in particular pivotable about a wiper blade pivot axis 68a. The wiper blade adapter 20a is configured for coupling to the wiper arm 110a, in particular a wiper arm adapter.

The adapter attachment 24a comprises two fluid connection extensions 28a, 28'a for fluidic connection to a respective spoiler element 14a, 14'a.

The wiper blade adapter 20a is connected to the fluid channels in the spoiler elements 14a, 14'a by the fluid connection extensions 28a, 28'a. The two fluid connection extensions 28a, 28'a are configured in the same way, in particular to have the same length, in particular measured using a length along a respective longitudinal axis 30a, 30'a. The two fluid connection extensions 28a, 28'a are disposed in alignment with one another.

The two fluid connection extensions 28a, 28'a are disposed at opposite ends along a longitudinal axis 32a of the wiper blade adapter 20a. The two fluid connection extensions 28a, 28'a define respective opposite plug connection directions 34a, 34'a which are oriented parallel to the longitudinal axis 32a of the wiper blade adapter 20a.

The wiper device 10a comprises a fluid supply unit 38a. The fluid supply unit 38a is configured to supply the channel unit 18a with wiper fluid (see FIG. 2).

Figure 2:
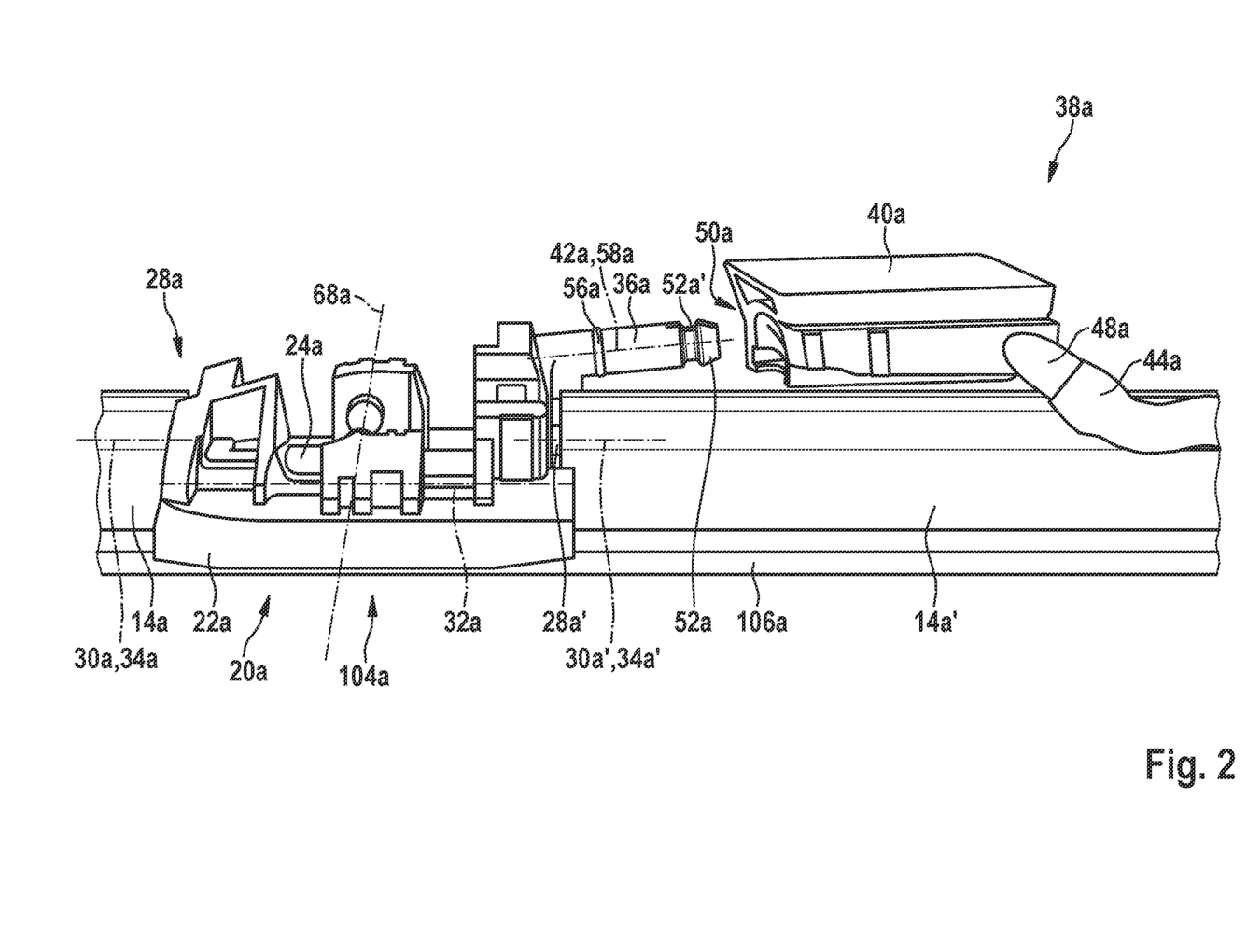

The fluid supply unit 38a comprises a coupling end piece 40a. The coupling end piece 40a is configured for latching connection to the at least one adapter attachment 24a.

The adapter attachment 24a comprises a coupling extension 36a. The coupling extension 36a is configured for connection to the coupling end piece 40a, in particular for insertion into the coupling end piece 40a. The coupling extension 36a is at least twice as long as the fluid connection extensions 28a, 28'a, in particular measured using a length along a respective longitudinal axis 30a, 30'a.

A plug-in axis 42a defined by the coupling extension 36a is oriented parallel to the longitudinal axis 32a of the wiper blade adapter 20a, in particular the adapter attachment 24a and/or the adapter base body 22a, with a deviation of no more than 10°. The plug-in axis 42a defined by the coupling extension 36a is oriented parallel to the longitudinal axis 30a, 30'a of the fluid connection extensions 28a, 28'a, with a deviation of no more than 10°. The coupling extension 36a is disposed offset to the fluid connection extensions 28a, 28'a in a direction perpendicular to the longitudinal axis 32a of the wiper blade adapter 20a.

The fluid supply unit 38a comprises a hose element 44a for conveying wiper fluid. The wiper device 10a can comprise the wiper arm 110a, which in particular comprises a wiper rod 114a and at least one wiper arm adapter (not shown). The wiper rod 114a is configured as a rigid metal bar, which is in particular curved. The wiper arm adapter (not shown) is configured as a part, in particular an end piece, preferably a key bit-like end piece, of the wiper rod 114a.

The wiper arm 110a, in particular the wiper arm adapter, comprises a transverse axis 46a which is oriented parallel to the wiper blade pivot axis 68a, in particular when the wiper arm 110a is connected to the wiper blade adapter 20a. The wiper arm adapter is in particular configured in one piece with the wiper rod 114a. The coupling extension 36a is disposed offset to the fluid connection extensions 28a, 28'a in a direction perpendicular to the transverse axis 46a of the wiper blade adapter 20a.

The hose element 44a, in particular the fluid supply unit 38a, extends along a longitudinal axis 66a of the wiper arm 110a over the full extent of the wiper rod 114a at least to the wiper arm adapter.

The coupling end piece 40a comprises a hose extension 48a for connection to the hose element 44a. The coupling end piece 40a comprises a coupling opening 50a for receiving the coupling extension 36a for fluidic connection to the wiper blade adapter 20a.

The latching connection between the coupling end piece 40a and the wiper blade adapter 20a can be implemented inside the coupling end piece 40a. The latching connection between the coupling end piece 40a and the wiper blade adapter 20a can be implemented by the coupling extension 36a inside the coupling end piece 40a.

The coupling extension 36a comprises two latching elements 52a, 52'a, which together form a tip of the coupling extension 36a.

The coupling end piece 40a comprises a latching recess 54a. The latching recess 54a is disposed on an end of the coupling opening 50a which faces the hose extension 48a. The latching recess 54a is a part of the coupling opening 50a.

The hose element 44a is connected to the wiper arm 110a, in particular the wiper rod 114a. The coupling end piece 40a is connected to the wiper arm 110a exclusively via the hose element 44a, in particular exclusively indirectly. The hose element 44a is connected, in particular clipped, to the wiper arm 110a. The coupling end piece 40a is movably mounted on the wiper arm 110a, in particular via the connection of the hose element 44a to the wiper arm 110a. The coupling end piece 40a is disposed on the wiper arm 110a in part at the level of the wiper arm adapter. The coupling end piece 40a is disposed on the wiper arm 110a in part directly behind a level of the wiper arm adapter.

The adapter attachment 24a comprises a sealing ring 56a for a fluidically tight connection to the coupling end piece 40a. The sealing ring 56a is disposed around the outside of the coupling extension 36a.

The coupling end piece 40a is configured as a female connector. The coupling end piece 40a is configured for partially receiving the adapter attachment 24a. The coupling end piece 40a is configured for receiving a major portion of the coupling extension 36a. The coupling end piece 40a is configured to receive at least 80% of an extent of the coupling extension 36a, in particular measured along a longitudinal axis 58a of the coupling extension 36a.

The coupling end piece 40a comprises at least one hose coupling element 60a and at least one adapter coupling element 62a which are connected to one another. The adapter coupling element 62a and the hose coupling element 60a are configured as one part. The adapter coupling element 62a and the hose coupling element 60a are configured in one piece.

The hose coupling element 60a is configured for direct connection to the hose element 44a. The hose coupling element 60a comprises the hose extension 48a. The adapter coupling element 62a is configured for direct connection to the wiper blade adapter 20a, in particular the adapter attachment 24a. The adapter coupling element 62a delimits at least most of the coupling opening 50a.

Figure 3:
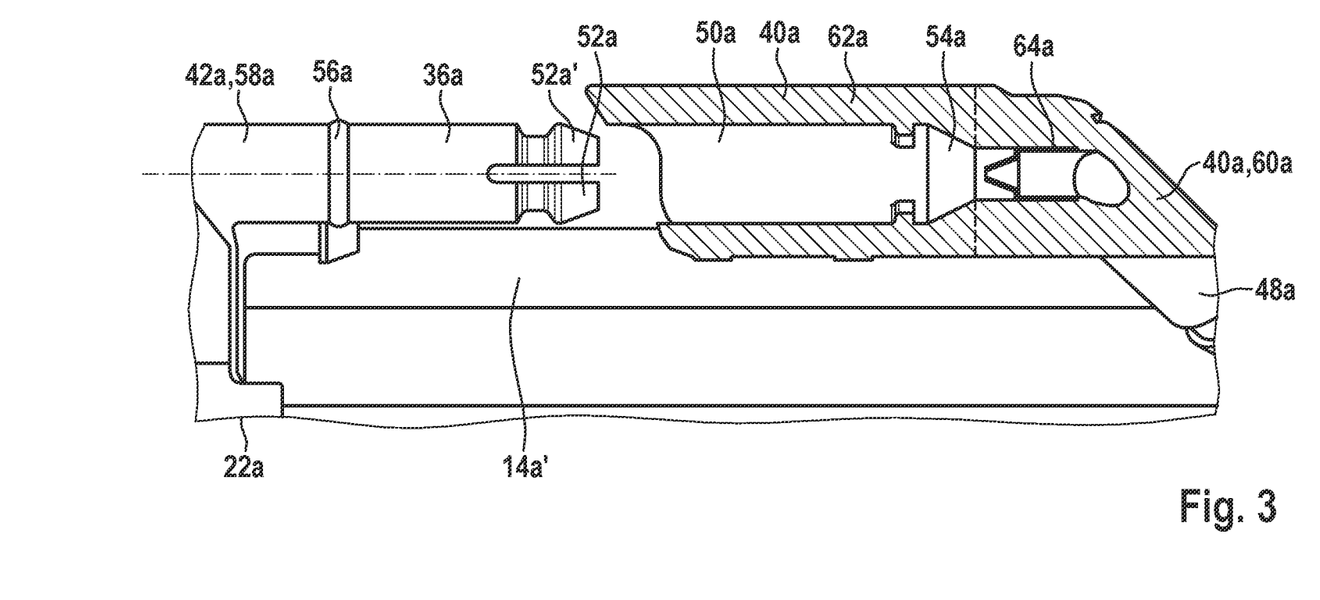

The coupling end piece 40a comprises a valve element 64a (see FIG. 3). The valve element 64a is configured as a check valve. The valve element 64a is integrated into the coupling end piece 40a, in particular disposed in the coupling end piece 40a. The valve element 64a is disposed in the hose coupling element 60a.

The valve element 64a is configured as a duckbill valve. The valve element 64a is made of an elastomeric material, in particular an elastomeric material mixture.

Figure 4:
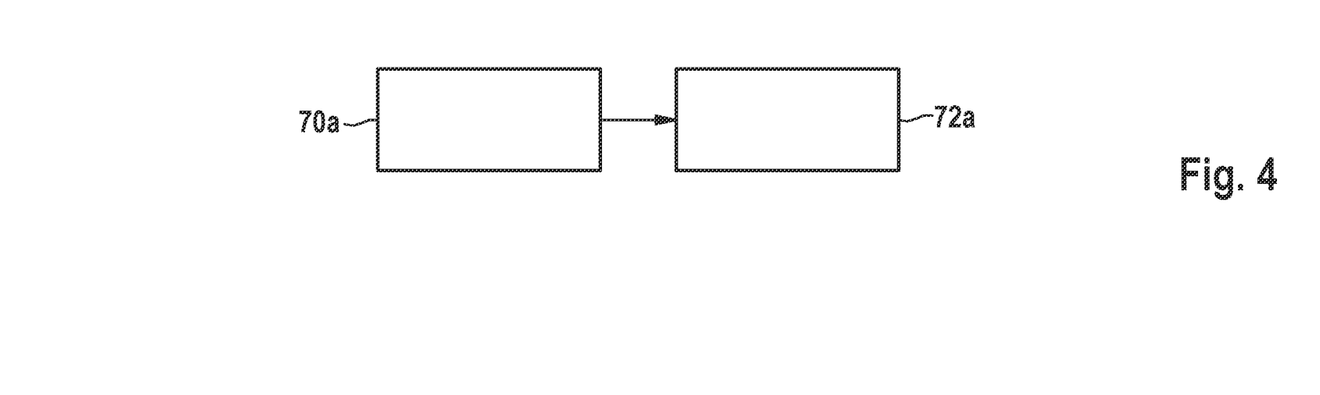

FIG. 4 shows a schematic of the method for assembling the wiper device 10a.

In at least one method step, in particular in a plug-in step 70a, the wiper arm 110a is plugged onto the wiper blade adapter 20a with the coupling end piece 40a.

In at least one method step, in particular in the plug-in step 70a, the coupling end piece 40a is plugged onto the coupling extension 36a.

In at least one method step, in particular in a further plug-in step 72a, the retaining spring 26a is pivotably connected to the adapter base body 22a and fixes the wiper arm adapter to the wiper blade adapter 20a.

Figure 5:
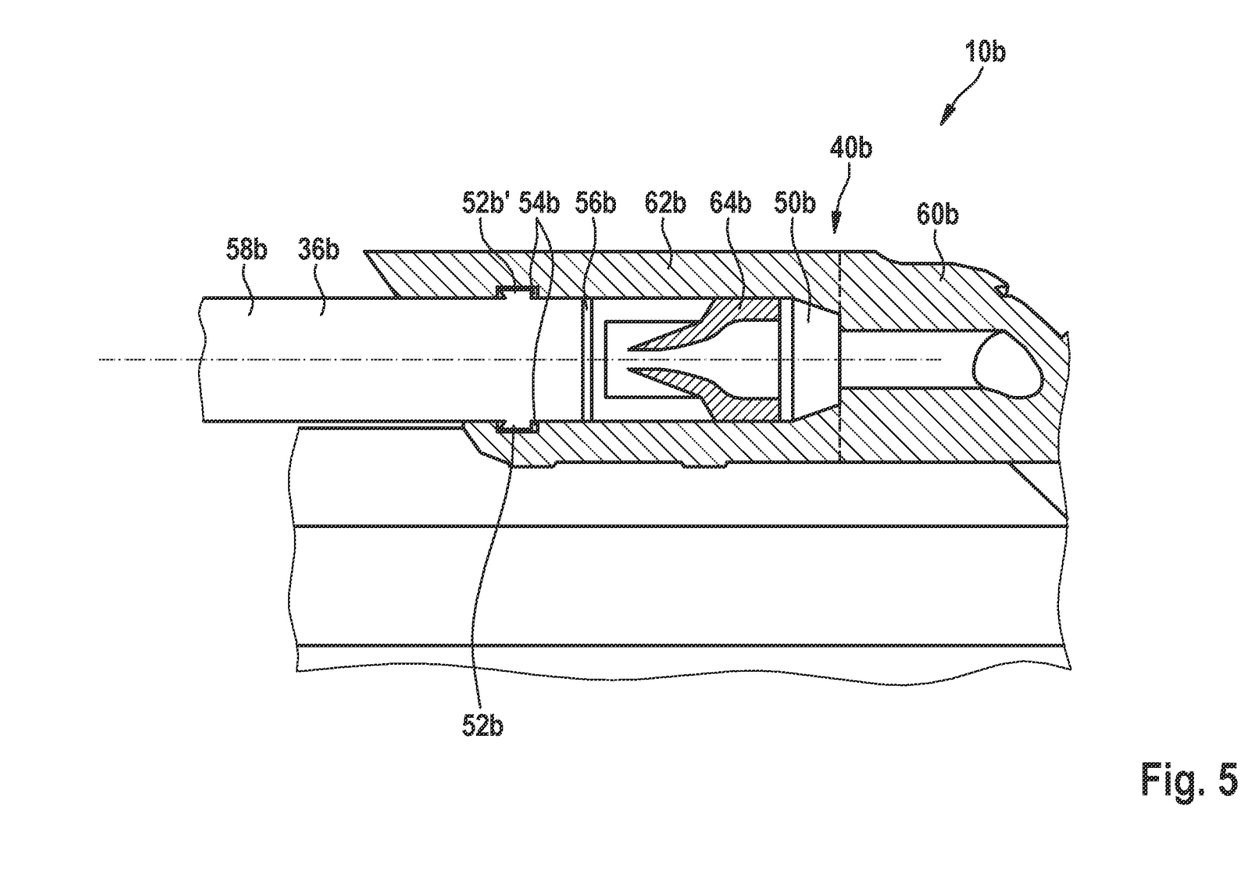
Figure 6:
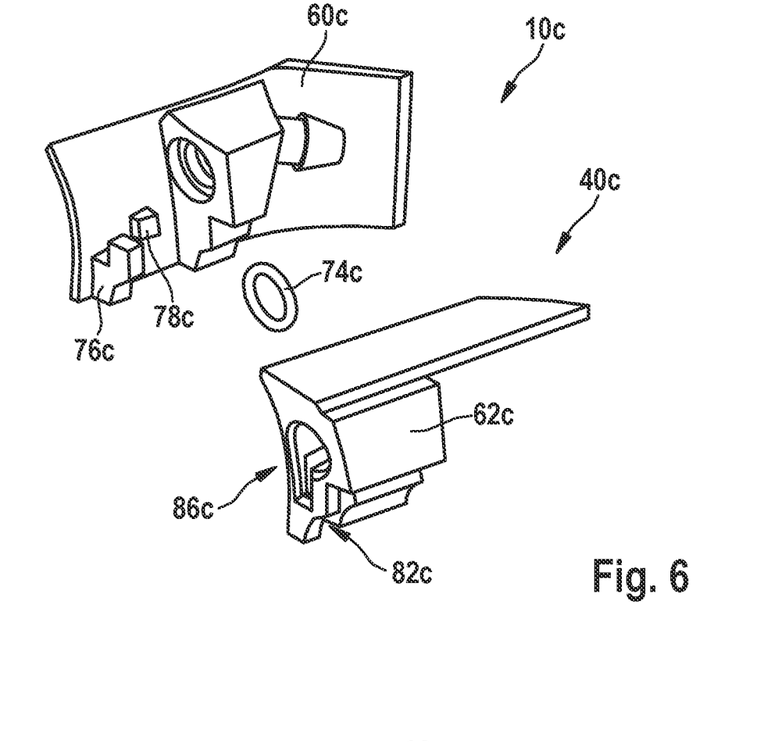
Figure 7:
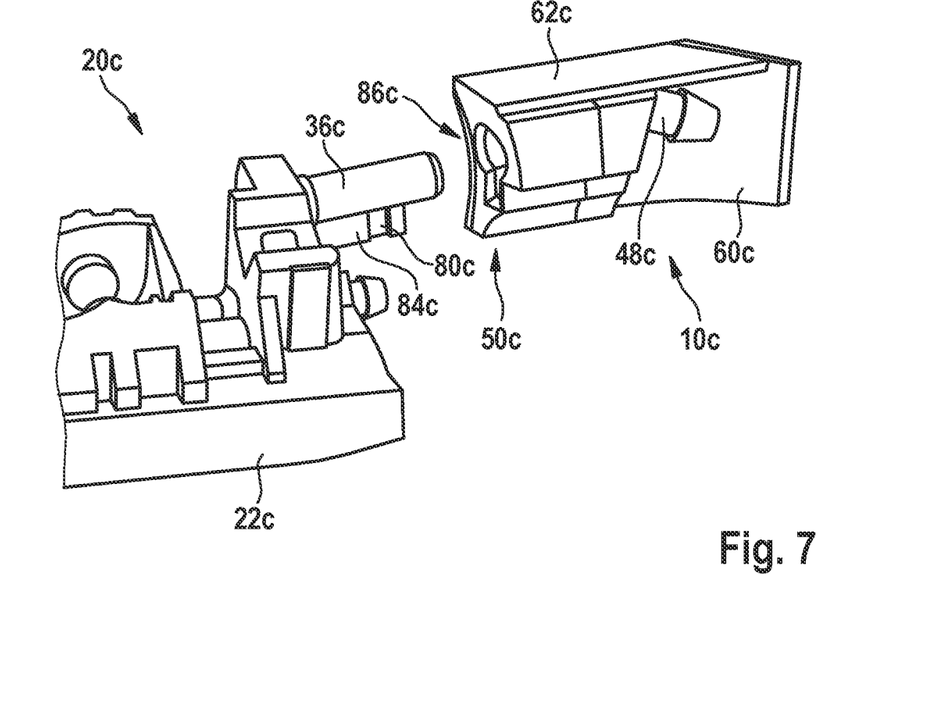

FIGS. 5 to 7 show further design examples of the invention. The following descrip-tions and the drawings are limited substantially to the differences between the design examples, wherein, with respect to identically named components, in particular with respect to components having identical reference signs, reference can in principle also be made to the drawings and/or the description of the other design examples, in particular of FIGS. 1 to 4. To distinguish between the design examples, the letter a has been placed after the reference signs of the design example in FIGS. 1 to 4. In the design examples of FIGS. 5 to 7, the letter a has been replaced by the letters b and c.

FIG. 5 shows an alternative wiper device 10b. The alternative wiper device 10b in particular comprises an alternative coupling extension 36b and an alternative coupling end piece 40b.

The coupling extension 36b comprises two latching elements 52b, 52b' which are disposed spaced apart from a tip of the coupling extension 36b, in particular with respect to an extent of the coupling extension 36b along a longitudinal axis 58b of the coupling extension 36b.

The coupling end piece 40b comprises a latching recess 54b. The latching recess 54b is disposed on an adapter coupling element 62b of coupling end piece 40b. The latching recess 54b is a part of a coupling opening 50b.

The coupling end piece 40b comprises a valve element 64b (see FIG. 3). The valve element 64b is configured as a check valve. The valve element 64b is integrated into the coupling end piece 40b, in particular disposed in the coupling end piece 40b. The valve element 64b is disposed in the adapter coupling element 62b. A sealing ring 56b is optional in this design example.

FIGS. 6 and 7 show an alternative wiper device 10c. The alternative wiper device 10c in particular comprises an alternative coupling extension 36c and an alternative coupling end piece 40c.

The coupling end piece 40c is configured in two parts. The coupling end piece 40c includes a hose coupling element 60c and an adapter coupling element 62c. The hose coupling element 60c and the adapter coupling element 62c are connected to one another by a latching connection, whereby the adapter coupling element 62c comprises a latching element 76c to the latching connection and the hose coupling element 60c comprises a corresponding latching recess 82c to the latching connection. The hose coupling element 60c and the adapter coupling element 62c are configured as two separate parts to form a, preferably non-releasable, latching connection with one another. The hose coupling element 60c and the adapter coupling element 62c are connected to one another in a fluidically tight manner by a sealing ring 74c.

The coupling end piece 40c is configured as a female connector comprising a coupling opening 50c which at least substantially has the form of a lock cylinder. An outer contour 86c of the coupling opening 50c disposed facing away from a hose coupling extension 48c is configured such that it at least substantially has the form of a lock cylinder. The coupling extension 36c comprises a key bit element 84c.

The hose coupling element 60c is configured for latching connection to the coupling extension 36c (see FIG. 7). The latching connection can be implemented, in particular is implemented, on a side of a coupling opening 50c facing a wiper blade adapter 20c, in particular when the wiper blade adapter 20c and the coupling end piece 40c are connected.

The hose coupling element 60c includes a further latching element 78c for latching connection to the coupling extension 36c. On a key bit-like projection, in particular on the key bit element 84c, the coupling extension 36c comprises a latching recess 80c for latching connection to the coupling end piece 40c, in particular the latching element 78c.

The invention claimed is:

1. A wiper device comprising at least one wind deflector unit (12a-12c) and at least one channel unit (18a-18c) integrated into the at least one wind deflector unit (12a-12c), and also comprising at least one wiper blade adapter (20a-20c) which includes at least one adapter attachment (24a-24c) and at least one adapter base body (22a-22c) and is configured to be coupled to at least one wiper arm (110a-110c), characterized by a fluid supply unit (38a-38c) which is configured to supply wiper fluid to the channel unit (18a-18c) and comprises at least one coupling end piece (40a-40c) for latching connection to the at least one adapter attachment (24a-24c), wherein the at least one coupling end piece (40a-40c) includes a housing and a check valve (64a-64c) disposed within the housing, wherein the at least one wiper blade adapter (20a-20c) includes an elongate coupling extension (36a-36c) that extends along a longitudinal axis (58a) away from the at least one adapter base body (22a-22c), wherein the elongate coupling extension (36a-36c) includes a distal tip having a first latching element (52a) and a second latching element (52a'), wherein the first latching element (52a) is spaced from the second latching element (52a') along a direction perpendicular to the longitudinal axis (58a) by a gap, wherein the elongate coupling extension (36a-36c) further includes a circumferential groove positioned proximal to the first latching element (52) and the second latching element (52a'), wherein the housing of the at least one coupling end piece (40a-40c) includes an elongate opening (50a) extending within an interior of the housing, wherein the at least one coupling piece (40a-40c) further includes a radially inwardly-extending protrusion.

2. The wiper device according to claim 1, characterized in that the adapter attachment (24a-24b) comprises at least one sealing ring (56a-56b) for a fluidically tight connection to the coupling end piece (40a-40b).

3. A wiper device according to claim 2, characterized in that the coupling end piece (40a-40c) is configured as a female connector for at least partially receiving the at least one adapter attachment (24a-24c).

4. A wiper device according to claim 3, characterized in that the coupling end piece (40a-40c) comprises at least one hose coupling element (60a-60c) and at least one adapter coupling element (62a-62c) which are connected to one another.

5. The wiper device according to claim 1, characterized in that the coupling end piece (40a-40c) is configured as a female connector for at least partially receiving the at least one adapter attachment (24a-24c).

6. The wiper device according to claim 1, characterized in that the coupling end piece (40a-40c) comprises at least one hose coupling element (60a-60c) and at least one adapter coupling element (62a-62c) which are connected to one another.

7. The wiper device according to claim 6, characterized in that the hose coupling element (60c) and the adapter coupling element (62c) are connected to one another via a latching connection.

8. The wiper device according to claim 1, characterized in that the coupling end piece (40c) is configured as a female connector comprising a coupling opening (50c) which at least substantially has the form of a lock cylinder.

9. The wiper device according to claim 1, characterized in that the valve element (64a-64b) is configured as a duckbill valve.

10. A windshield wiper comprising a wiper device (10a-10c) according to claim 1.

11. The wiper device according to claim 1, wherein the at least one coupling end piece (40a-40c) includes a latching recess (54a-54c) within the housing.

12. The wiper device according to claim 11, wherein the check valve (64a-64c) is disposed upstream of the latching recess (54a-54c), such that the latching recess (54a-54c) is positioned between the check valve (64a-64c) and the at least one channel unit (18a-18c).

13. The wiper device according to claim 11, wherein the at least one wiper blade adapter (20a-20c) includes a coupling extension (36a-36c) having a tip configured to extend into the latching recess (54a-54c), such that the check valve (64a-64c) is disposed upstream of the tip.

14. The wiper device according to claim 13, wherein the tip includes two latching elements (52a, 52a').

15. The wiper device according to claim 1, wherein the elongate coupling extension (36a-36c) is sized and shaped so as to be inserted into the elongate opening (50a) of the housing until the first latching element (52) engages the radially-inwardly extending protrusion, forcing the gap to be reduced.

16. The wiper device according to claim 15, wherein the elongate coupling extension (36a-36c) is further sized and shaped to be inserted further into the elongate opening (50a) of the housing until the radially-inwardly extending protrusion engages into the circumferential groove, and the first latching element (52a) is positioned between the radially-inwardly extending protrusions and the check valve (64a-64c).

* * * * *